Oct. 4, 1955  J. A. BOWER  2,719,623
STEADYING DEVICE
Filed Sept. 13, 1952  3 Sheets-Sheet 1

INVENTOR.
James A. Bower
BY Webb Mackay and
Burden
HIS ATTORNEYS

INVENTOR.
James A. Bower

HIS ATTORNEYS

Oct. 4, 1955 J. A. BOWER 2,719,623
STEADYING DEVICE
Filed Sept. 13, 1952 3 Sheets-Sheet 3
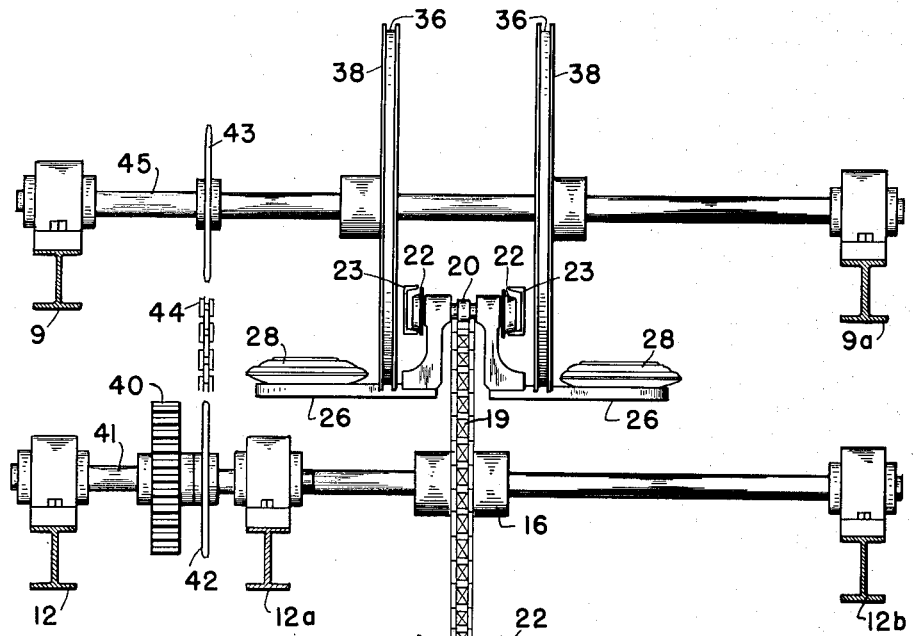
Fig. 3
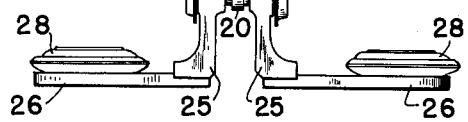
Fig. 4
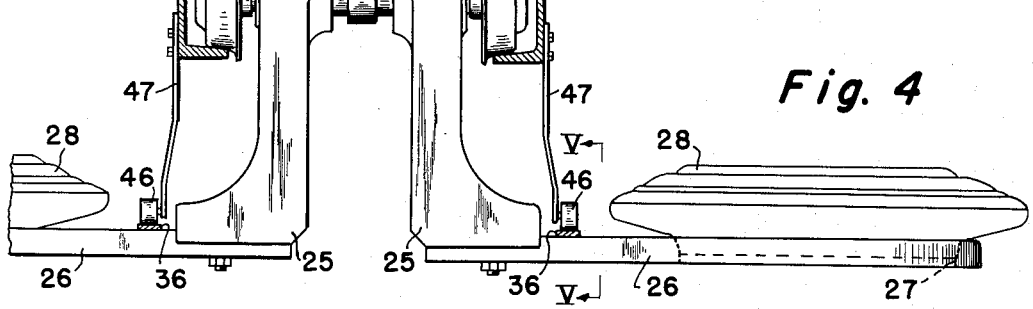
Fig. 5
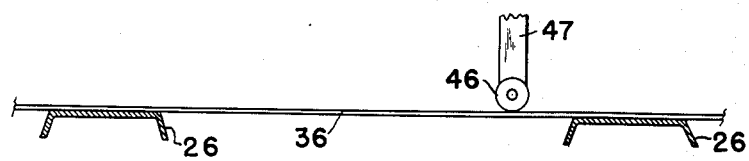
INVENTOR.
James A. Bower
BY
HIS ATTORNEYS

United States Patent Office 2,719,623
Patented Oct. 4, 1955

2,719,623

STEADYING DEVICE

James A. Bower, East Liverpool, Ohio, assignor to Taylor, Smith & Taylor, East Liverpool, Ohio, a corporation of Ohio, The Hall China Company, East Liverpool, Ohio, a corporation of Ohio, and Harker Pottery Co., Chester, W. Va., a corporation of Ohio Application September 13, 1952, Serial No. 309,527

8 Claims. (Cl. 198—19)

This application relates to a steadying device which is intended for use with machinery for carrying on manufacturing processes in which materials in raw or semi-completed condition are moved from one work station to another, at which stations various steps in the manufacture of the article are carried out. My invention may, for example, form part of an automatic ware forming machine used in potteries for forming such articles as dinnerware.

In machinery where a series of processing steps are performed on workpieces (i. e., articles in raw or semi-finished condition which are being processed through the machinery), the workpieces are carried from station to station on conveyors generally in the form of endless chains from which receptacles for the workpieces are suspended. Frequently, the conveyors move through different levels and, therefore, it is necessary to make some arrangement for keeping the receptacles on a horizontal plane so that the workpieces will stay on the receptacles and so that the workpieces will approach a work station in the proper position for processing at that station.

In order that the receptacles may remain in a horizontal plane in spite of the fact that the conveyor may move from one level to another, the receptacles are hinged adjacent one of their ends to the chain and swing freely therefrom. Where the processes at each work station are carried on wholly automatically, it is obviously important that the receptacles should be level and in line with the processing machinery at each station. Therefore, the receptacle, although freely swinging on the conveyor chain, must be held fixed in a definite plane of movement as they approach a work station and are at the work station.

To guide the receptacles into the work station, it has heretofore been proposed that the free swinging ends of the receptacles run in tracks. Tracks, however, have not been satisfactory. If a close fit is maintained between the tracks and the receptacles, friction between the two holds the lower swinging end of the receptacle while the chain to which the upper end is pivoted continues to move. This tilts the receptacle and is as objectionable as a swinging receptacle. If the fit between the track and the receptacle is loose, the receptacle is not held closely enough to the plane of movement required for each work station.

I have invented a device for holding the receptacle in the proper plane, which is positive in action but which, at the same time, avoids the problems heretofore created by the use of tracks. I provide a flat, metal strip or band which moves in a plane parallel to the path of movement of the receptacles adjacent to and at the work stations and which engages the receptacles adjacent their swinging ends and thereby keeps them from swinging. The strip moves at the same rate of speed as the receptacles and, therefore, there is no problem of sliding friction between the strip and the receptacles as there is in the case of tracks.

My steadying device can be used in any kind of automatic machinery used in manufacturing processes. I have, however, found it to be particularly useful in ware forming machinery used in potteries and, therefore, my invention will be described with reference thereto, but it is to be understood that my invention is not limited to use with ware forming machinery.

In the accompanying drawings, I have illustrated a present preferred embodiment of my invention in which—

Figure 3 is a right-hand end view of the structure shown in Figure 2 on an enlarged scale;

Figure 4 is an enlarged end view of the conveyor used in the machine shown in Figure 1 with certain portions removed; and Figure 5 is a section along the lines V—V of Figure 4.

Figure 1 shows a ware forming machine which may be used in potteries to form green clay pieces which are subsequently passed through a kiln and fired to make ceramic articles as, for example, dinnerware. Only a portion of such a machine is shown in Figure 1.

Figure 1:
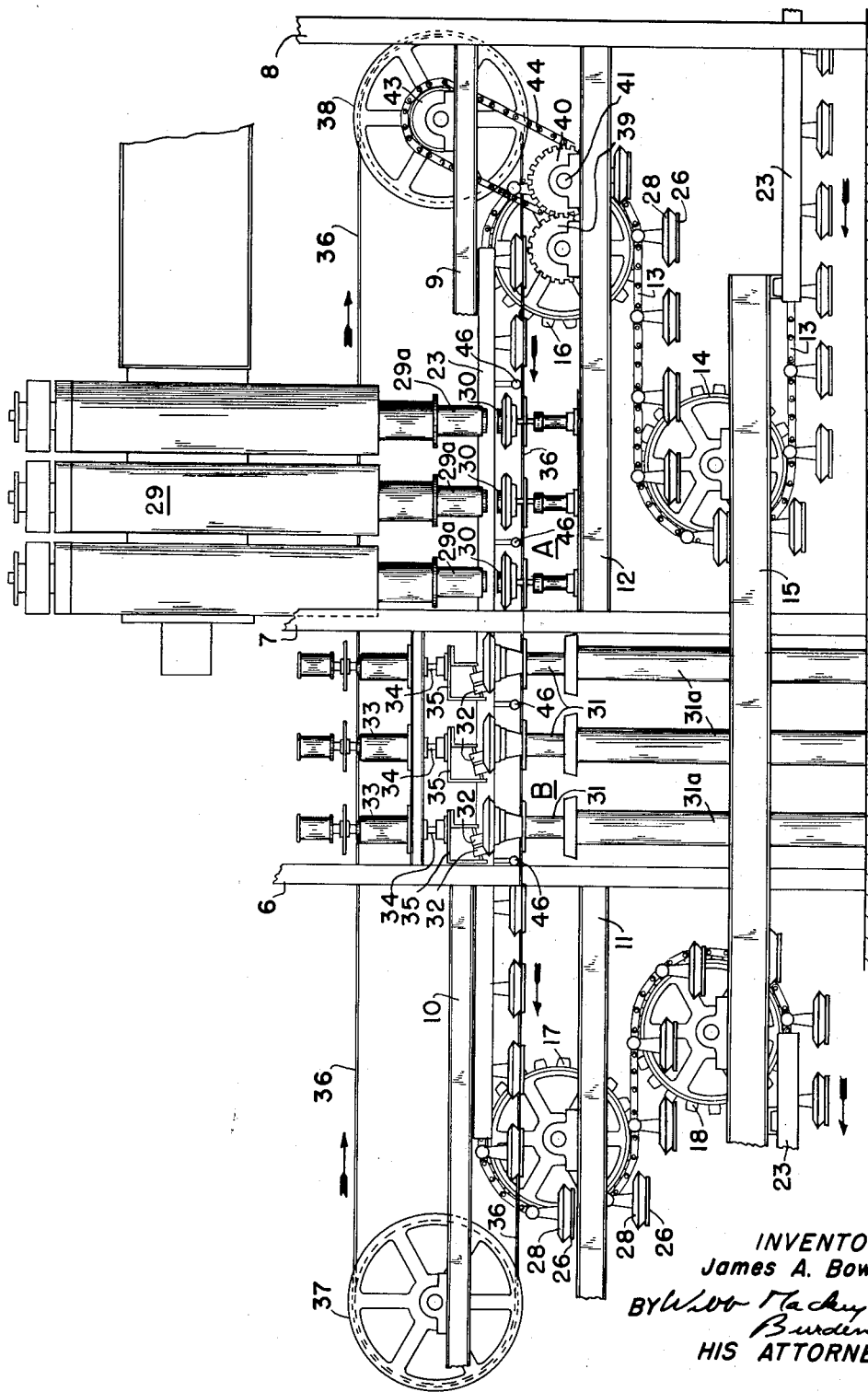
Figure 1 is a front elevation of a portion of a ware forming machine and embodying my invention.
Figure 2:
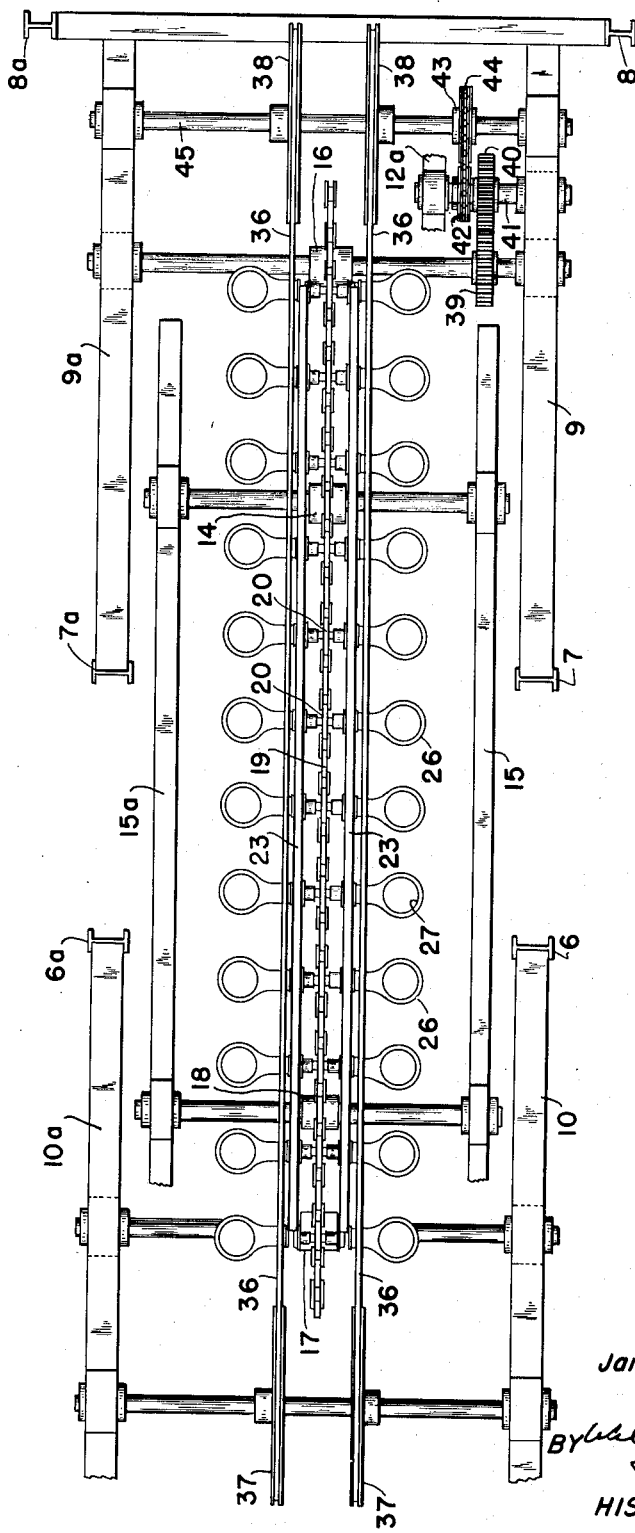
Figure 2 is a plan view of the structure shown in Figure 1 with portions of the structure removed for purposes of illustration.

Referring to Figures 1, 2 and 3, the machine has a framework composed of vertical posts or pillars 6, 6a, 7, 7a, 8 and 8a and horizontal beams 9, 10, 11 and 12. There are additional horizontal beams to the rear of the machine (viewing Figure 1) which correspond to the beams 9, 10, 11 and 12 and when they appear in the drawings, they are designated 9a, 10a, etc.

A conveyor 13 moves from the lower right-hand side of the forming machine (viewing Figure 1), passes over a sprocket wheel 14 mounted on horizontal beams 15 and 15a. It then passes around a second sprocket wheel 16 rotatably mounted on beams 12a and 12b and then moves horizontally to the left (viewing Figure 1) to a sprocket wheel 17. It then passes around the sprocket wheel 17 rotatably mounted on the beam 11 and then around a sprocket wheel 18, also mounted on the beam 15. The conveyor finally moves out away from the forming machine to the left as shown in Figure 1.

The structure of the conveyor 13 is shown in Figures 2, 3 and 4. It comprises a continuous link chain 19, every fourth link 20 of which has a laterally extending hub 21 in which a shaft (not shown in the drawings) is journalled. The two ends of the shaft carry wheels 22 which run in tracks 23 supported in the framework of the machine. Two hanger arms 24, one on each side of each link 20, rotate about the hub 21 at their upper ends. The lower freely swinging ends 25 of the hanger arms extend down from the chain and outwardly for a short distance beneath the tracks 23.

A receptacle or tray 26 for conventional plaster of Paris moulds, on which the clay is formed, is fastened to the lower ends of each of the hanger arms 25 and extends outwardly from the hanger arms. As shown in Figures 2 and 4, the trays 26 are flat plates, narrow at one end where they are fastened to the hanger arms, and wide at their outer ends where they have a circular opening 27 into which the bases of plaster of Paris moulds 28 fit. Referring to Figures 1 and 3, it will be seen that, although the chain goes around the sprocket wheel 16, and thereby moves from one level to another, the trays 27 remain in a horizontal position since the hanger arms 24 rotate about the hubs 21.

Referring again to Figure 1, the conveyor moves from a station (not shown) where moulds are placed on the trays and brings the moulds over the sprocket wheels 14 and 16 to a station, designated generally by the reference letter A, where a pug mill 29 drops "bats" or "pugs" of clay 30 onto the moulds. The conveyor next carries the moulds to a station, designated generally by the reference letter B, where pistons 31 acting in cylinders 31a move up through the openings 27 in the trays and raise the moulds with the clay pugs on them up against forming rollers 32. Motors 33, with vertically extending shafts 34, support the forming rollers 32 in frames 35. After the moulds have been raised to the position shown in Figure 1 against the rollers 32, the motors 33 are started and the rollers roll over the moulds 28 and the clay pugs, and thereby form the clay piece which is subsequently dried and fired to make a finished ceramic piece.

The pistons 31 are retracted so that the moulds are again carried by the trays 26 and the conveyor moves from the work station B over the sprocket wheel 17 and the sprocket wheel 18 out to the left (viewing Figure 1) to drying rooms, not shown in the drawings.

It will be noted from Figure 1 that the pug mill 29 has three feeding tubes 29a on one side and that the forming station B has three forming rollers 32 on one side. There is another set of three feeding tubes and another set of three rollers back of those shown in the figure to feed clay onto the moulds carried by the trays opposite to those shown in Figure 1 and to form the clay. The conveyor is moved intermittently so as to bring three moulds at a time under each set of feeding tubes 29a and rollers 32. Since there are two sets of trays, six moulds receive clay at a time and six pieces are formed at the same time. The movement of the conveyor, except at the work stations A and B, is continuous. In order to provide for a pause at the work stations while work is being done on the workpieces, the sprocket wheels 14 and 18 are reciprocated back and forth in a horizontal plane. A drive (not shown in Figure 1) reciprocates the beam 15 which carries the sprocket wheels 14 and 18 in time with control mechanism for the pug mill 29 and the roller motors 33.

As previously described, the trays 26 swing freely on the conveyor chain 19. When the moulds 28 come under the pug mill 29, it is obviously important that the moulds come to rest squarely under the feeding tubes 29a of the pug mill. If the trays are swinging at the time a pug is cut off and dropped onto the moulds, the pug will not land squarely on the center of the moulds. When moulds with off-center pugs are brought under the forming rollers 32, then, of course, the rollers cannot form the clay properly.

It is also important when the moulds come to the forming station B that the trays be squarely in line with the pistons 31 which raise the moulds. If the trays are swinging at the time that the pistons are raised, the pistons may strike the rim of the tray and destroy them.

I have provided a steadying device for the trays as they approach the work stations A and B and for holding them steady while they are at the work stations. For the machine shown in the drawings, I actually provide two devices, one for the trays on one side of the chain and one for the trays on the other side. The devices are identical in structure and operation, and therefore only one will be described in detail.

I provide a thin, flat strip 36 which moves in a path parallel to the path of the trays as they approach, pause at, and leave the work stations A and B. Referring to Figure 1, it will be seen that the strip extends from a point adjacent to, but in advance of, the first work station A and continues to a point to the rear of the second work station B. Referring to Figures 1, 4 and 5, it will be seen that the strip 36 not only moves in a plane parallel to the path of the trays 26, but also that in this plane it engages the top surface of the trays near the point where they are secured to the hanger arms 25. The strip thus engages the trays near their free or swinging end.

By mechanism later described, the strip moves at the same rate of speed as the conveyors 26. Referring to Figure 1, it will be seen that the conveyors, in coming around the sprocket wheel 16, rise up so that they contact the strip 36. It moves with them as they pass towards the work station A and thereby it holds the trays 26 in a horizontal position and prevents them from swinging as they approach the work stations A and B and while they are at those stations.

The strip 36 is continuous and is carried on pulley guides 37 and 38 which are rotatably mounted on the horizontal beams 9 and 10, at points beyond the travel of the strip when it is in contact with the trays 26. A gear 39 keyed to the same shaft as the sprocket wheel 16, meshes with a gear 40 keyed to a shaft 41 journaled on the horizontal beams 12 and 12a. A chain sprocket 42 is keyed to the shaft 41 and drives another sprocket wheel 43 by the chain 44. The sprocket 43 is keyed to a shaft 45 journaled on the horizontal beams 9 and 9a. The shaft 45 carries the pulley guide 38. The gears 39 and 40 are the same in diameter and the sprocket wheels 42 and 43 are the same diameter to each other. The pulley guides 37 and 38 have the same diameter as the sprockets 16 and 17 and, therefore, the strip 36 moves at the same speed as the trays 26.

As appears in Figure 1, there is a considerable reach between the pulley guides 37 and 39, and, therefore, I provide guides to hold the strip 36 down against the trays 26. The guides are shown in Figures 4 and 5. They comprise rollers 46 carried on straps 47 which hang down from the tracks 23. As shown in Figure 1, these guides are spaced along the portion of the strip 36 which contacts the trays.

From the foregoing, it will be seen that I provide positive means for preventing the trays from swinging as they approach the work stations. Since the strip moves at the same speed as the trays, there is no problem of adjusting a clearance between the strip and the trays. My steadying device is simple yet wholly effective for the purpose intended.

While I have described a present preferred embodiment of my invention, it is to be understood that it may be otherwise embodied within the scope of the appended claims.

I claim:

1. In machinery for manufacturing articles in one or more steps having work stations where one or more of the steps are carried out, and a conveyor for moving workpieces to the stations, the conveyor having freely swinging receptacles for holding the workpieces, a device for steadying the receptacles at the work stations, said device comprising a strip extending parallel to the path of the receptacles adjacent to and at the work stations, said strip contacting each of the receptacles while they are at the work stations, and means for moving the strip at substantially the same speed as the conveyor and in a path to contact the receptacles.

2. In machinery for manufacturing articles in one or more steps having work stations where one or more of the steps are carried out, and a conveyor for moving workpieces to the stations, the conveyor having freely swinging receptacles for holding the workpieces, a device for steadying the receptacles at the work stations, said device comprising a strip extending parallel to the path of the receptacles adjacent to and at the work stations, said strip contacting each of the receptacles while they are at the work stations, means for moving the strip at substantially the same speed as the conveyor and in a path to contact the receptacles, and means for guiding the strip in its path of movement.

3. In machinery for manufacturing articles in one or more steps having work stations where one or more of the steps are carried out, and a conveyor for moving workpieces to the stations, the conveyor having freely swinging receptacles for holding the workpieces, a device for steadying the receptacles at the work stations, said device comprising a strip extending parallel to the path of the receptacles adjacent to and at the work stations, said strip engaging a surface on the receptacle which is adjacent the free end of the receptacle on the conveyor while the receptacles are at the work stations, and means for moving the strip at substantially the same speed as the conveyor.

4. In machinery for manufacturing articles in one or more steps having work stations where one or more of the steps are carried out, and a conveyor for moving workpieces to the stations, the conveyor having freely swinging receptacles for holding the workpieces, a device for steadying the receptacles at the work stations, said device comprising a strip extending parallel to the path of the receptacles adjacent to and at the work stations, said strip engaging a plane surface on each of the receptacles while they are at and adjacent to the work stations, and means for moving the strip at substantially the same speed as the conveyor.

5. In machinery for manufacturing articles in one or more steps having work stations where one or more of the steps are carried out, and a conveyor for moving workpieces to the stations, the conveyor having freely swinging receptacles for holding the workpieces, a device for steadying the receptacles at the work stations, said device comprising a strip extending parallel to the path of the receptacles adjacent to and at the work stations, said strip engaging a surface on the receptacles which, when the receptacles are adjacent to and at the work stations, lie parallel to the path of travel of the receptacles to the work stations and beneath the point of suspension of the receptacles, and means for moving the strip at substantially the same speed as the conveyor.

6. In machinery for manufacturing articles in one or more steps having work stations where one or more of the steps are carried out, and a conveyor for moving workpieces to the stations, the conveyor having freely swinging receptacles for holding the workpieces, a device for steadying the receptacles at the work stations, said device comprising a continuous strip, a portion of which extends parallel to the path of the receptacles adjacent to and at the work stations, said portion also contacting each of the receptacles while they are at the work stations, pulleys at each end of said portion over which the strip runs to guide the strip in a path whereby it can contact said receptacles, and means for driving the pulleys whereby the strip moves at a speed substantially the same as the conveyor.

7. A device as described in claim 6 and having means between the pulleys for guiding the portion of the strip which engages the receptacles.

8. A device as described in claim 6 and having rollers engaging the portion of the strip which engages the receptacles to guide said portion of the strip in its movement.

References Cited in the file of this patent

UNITED STATES PATENTS

| 1,984,685 | Marcy | Dec. 18, 1934 |

FOREIGN PATENTS

| 263,527 | Germany | Aug. 13, 1913 |